United States Patent
Garcia-Luna-Aceves et al.

(10) Patent No.: US 7,031,308 B2
(45) Date of Patent: Apr. 18, 2006

(54) TREE-BASED ORDERED MULTICASTING METHOD

(75) Inventors: J. J. Garcia-Luna-Aceves, San Mateo, CA (US); Hans-Peter Dommel, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 947 days.

(21) Appl. No.: 10/035,348

(22) Filed: Oct. 30, 2001

(65) Prior Publication Data

US 2002/0091846 A1 Jul. 11, 2002

Related U.S. Application Data

(60) Provisional application No. 60/244,405, filed on Oct. 30, 2000.

(51) Int. Cl.
*H04L 12/28* (2006.01)
*H04L 12/56* (2006.01)

(52) U.S. Cl. ............. 370/390; 370/401; 370/407; 370/408; 370/465; 370/486; 370/487; 709/220; 709/221; 709/226; 709/227; 709/243; 709/244

(58) Field of Classification Search ............... None
See application file for complete search history.

(56) References Cited

U.S. PATENT DOCUMENTS 5,195,086 A * 3/1993 Baumgartner et al. ...... 370/264
5,541,927 A * 7/1996 Kristol et al. ............... 370/408
6,353,596 B1 * 3/2002 Grossglauser et al. ...... 370/256
6,487,690 B1 * 11/2002 Schuster et al. ............ 714/752

OTHER PUBLICATIONS

Levine, Brain Neil et al.; "The Case for Reliable Concurrent Multicasting Using Shared Ack Trees," Proceedings ACM Multimedia, pp. 365-376, Boston MA, Nov., 1996.
Paul, Sanjoy etl al; "Reliable Multicast Transport Protocol (RMTP)," IEEE Journal on Selected Areas in Communications, vol. 15, No. 3, pp. 407-421, Apr., 1997.

(Continued)

*Primary Examiner*—Wellington Chin
*Assistant Examiner*—Raj Jain
(74) *Attorney, Agent, or Firm*—John P. O'Banion

(57) ABSTRACT

A method for performing end-to-end "tree-based ordered multicasting" (TOM) which ensures collective integrity and consistency of distributed operations, and which is applicable to distributed multiparty collaboration and other multipoint applications. The TOM protocol performs cascaded total ordering of messages among on-tree hosts en route from senders to receivers, and does not require the building of a separate propagation graph to compute ordering information. TOM elects sequencer nodes dynamically based on address extensions of the multicast tree. Message ordering is performed by multicasting a message from each source node to receivers, unicasting a control message from a source node across a primary node to an ordering node for the designated multicast group or transmission in the tree, determining a binding sequence number for the message and a multicast to the receiver group, and delivering messages at end hosts according to the agreed-upon sequence numbers.

11 Claims, 5 Drawing Sheets

```
proc TOM (node i)
Cobegin
    TOM_send(); TOM_receive()
Coend
proc TOM_send (message m^b, receivers Rec)
Begin /* i is SN */
    If m ≠ 0 And i = SN(m)
        Then m^h = (l(i)_Rec, seq_#, _, false)
            m = (m^h, m^b)
            reliable_multicast(m, Rec)
            TOM_cast(m^h, parent(i))
End
proc TOM_cast (message m, receiver rec)
Begin /* self-route from node i to rec */
    If il(i)l > ll(receiver)l)
        OrIf l(i) ≠ prefix(rec)
        Then If ∃ parent(i)
            Then unicast(m) to parent(i)
            Else If ∃ children(i)
                Then unicast(m) to child(i)
                    where l(child(i)) = prefix(l(rec))
End
proc TOM_receive (message m; receivers Rec)
Begin
    If i ∈ Rec(m) /* i is EN */
        Then unicast(m) to parent(i);
    Else If of(m) = false And m^b = 0 /* i is pN */
        Then tag with new seq#;
            TOM_cast(m, parent(i))
    Else If l(i) ∈ Rec /* i is RN */
        Then If m^b ≠ 0. And of(m) = false
            Then insert (m^b, uw)
            Else shift m from uw to ow
                deliver(head(ow), local processes)
    Else compute longest common prefix lcp = (m, pm)
        If lcp = l(i) /* i is ON */
            And (query parent(i) for pending msgs = 0)
            Then Forall msgs in uw select seq#s
                shift msgs with set seq#s into ow
                TOM_cast(head(ow, Rec))
End
```

OTHER PUBLICATIONS

Yavatkar, Rajendra; "A Reliable Dissemination Protocol for Interactive Collaborative Applications," Proceedings ACM Mutlimedia, pp. 333-344, San Francisco, CA., Nov., 1995.

Shieh, S.-P. et al.; "A Comment on 'A Total Order Multicast Protocol Using Propagation Trees,'" IEEE Transactions on Parallel and Distribution Systems, vol. 8, No. 10, pp. 1084, Oct., 1997.

Chandra, T. et al.; "Unreliable Failure Detectors for Reliable Distributed Systems," Journal of the ACM, vol. 43, No. 2, pp. 225-267, Mar., 1996.

Cheriton, D.R. and Skeen, D., "Understanding the Limitations of Causally and Totally Ordered Communication," Operating Systems Review, vol. 27, No. 5, pp. 44-57, Dec., 1993.

Dolev, D. et al.; "Early Delivery Totally Ordered Multicast in Asynchronous Enviroments," International Symposium on Fault-Tolerant Computing, pp. 544-553, Toulouse, France, Jun., 1993.

Garcia-Molina, H. et al; "Ordered and Reliable Multicast Communication," ACM Transactions on Computing System, vol. 9, No. 3, pp. 242-271, Aug., 1991.

Guerraoui, R. et al.; "Total Order Mutlicast to Multiple Groups," Proceedings 17th International Conference on Distributed Computing Systems, pp. 578-585, Baltimore, Maryland, May, 1997.

Jia, X.; "A Total Ordering Multicast Protocol Using Propagation Trees," IEEE Tranactiosn on Parallel and Distributing Systems, vol. 6, No. 6, pp. 617-627, Jun., 1995.

Lamport, L.; "Time, Clocks and the Ordering of Events in a Distributed System," Communications ACM, vol. 21, No. 7, pp. 558-565, Jul., 1978.

Navaratnam, S. et al.; "Reliable Group Communication in Distributed Systems," Proceedings 8th International Conference on Distributed Computing Systems, pp. 439-446, San Jose, CA., Jun., 1988.

Ng, T.P.; "Ordered Broadcast for Large Applications," Proceedings IEEE 10th Symposium Reliable Distributing Systems, pp. 188-197, PIsa, Italy, Sep., 1991.

Obraczka, K.; "Multicast Transport Protocols: A Survey and Taxonomy," IEEE Communications Magazine, vol. 36, No. 1, pp. 94-102, Jan., 1998.

Rajagopalan, B. et al.; "A Token-Based Protocol for Reliable, Ordered Multicast Communication," Proceedings of the 8th Symposium on Reliable Distributed Systems, pp. 84-93, Seattle, WA., Oct., 1989.

Rodrigues, L. et al.; "Totally Ordered Multicast in Large-Scale Systems," Proceedings of the 16th Internatinoal Conference on Distributed Computing Systems, pp. 503-510, Hong Kong, May, 1996.

Rodrigues, L. et al.; "Scalable Atomic Multicast," Proceedings of the 7th International Conference on Computer Communications and Networks, pp. 840-847, Lafayette, LA, Oct., 1998.

ZeinEldine, O. et al.; "Multicast in Interconnected Networks," Proceedings of Symposium on Computers and Communications, pp. 313-319, Alexandria, Egypt, Jun., 1995.

* cited by examiner

```
proc TOM (node i)
Cobegin
     TOM_send(); TOM_receive()
Coend
proc TOM_send (message $m^b$, receivers Rec)
Begin /* i is SN */
     If m ≠ 0 And i = SN(m)
        Then $m^h$ = (l(i)_Rec, seq_#, _, false)
             m = ($m^h$, $m^b$)
             reliable_multicast(m, Rec)
             TOM_cast($m^h$, parent(i))
End
proc TOM_cast (message m, receiver rec)
Begin /* self-route from node i to rec */
     If |l(i)| > |l(receiver)|
     OrIf l(i) ≠ prefix(rec)
     Then If ∃ parent(i)
               Then unicast(m) to parent(i)
          Else If ∃ children(i)
               Then unicast(m) to child(i)
                    where l(child(i)) = prefix(l(rec))
End
proc TOM_receive (message m; receivers Rec)
Begin
     If i ∉ Rec(m) /* i is EN */
        Then unicast(m) to parent(i);
     Else If of(m) = false And $m^b$ = 0 /* i is pN */
        Then tag with new seq#;
             TOM_cast(m, parent(i))
     Else If l(i) ∈ Rec /* i is RN */
        Then If $m^b$ ≠ 0. And of(m) = false
               Then insert ($m^b$, uw)
             Else shift m from uw to ow
                  deliver(head(ow), local processes)
     Else compute longest common prefix lcp = (m, pm)
          If lcp = l(i) /* i is ON */
          And (query parent(i) for pending msgs = 0)
             Then Forall msgs in uw select seq#s
                  shift msgs with set seq#s into ow
                  TOM_cast(head(ow), Rec))
End
```

FIG. 4

TREE-BASED ORDERED MULTICASTING METHOD

CROSS-REFERENCE TO RELATED APPLICATIONS

This application claims priority from U.S. provisional application Ser. No. 60/244,405 filed on Oct. 30, 2000, incorporated herein by reference.

STATEMENT REGARDING FEDERALLY SPONSORED RESEARCH OR DEVELOPMENT

This invention was made with Government support under Grant No. F19628-96-C-0338 awarded by the Air Force Office of Scientific Research (AFOSR). The Government has certain rights in this invention.

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to network multicast communication, and more particularly to ordering services for tree-based concurrent multicasting.

2. Description of the Background Art

Multicast communication generalizes the unicast (point-to-point) and broadcast (one-to-all) communication models in computer networks to multipoint dissemination of messages. A source must send a packet only once to the network interface, and packets are transparently replicated on their transmission paths to the receivers. This form of communication is indispensable for networked applications with high-volume data transfer, such as distributed software updates, news casts, video-on-demand, or telecollaboration systems. The concept of multicasting is gradually adapted and deployed with IP multicast protocols in the Internet, however, those mechanisms lack reliable or order-preserving delivery of packets to a multicast group. Reliable multicast guarantees that all packets sent from a source to a group of receiving hosts are disseminated without error. Ordered delivery of multimedia data from multiple sources is essential for a growing number of Internet applications, with the goal to preserve data consistency and the coherency of group activities. Ordering in previously developed reliable multicasting protocols is only considered for nodes arranged in ring topologies, or deferred to the application layer. A large body of work in the field of total and causal ordering for multicast messages is centered around fault tolerance or consistency issues in distributed systems.

Therefore, a need exists for a method of ordered multicasting that operates directly on reliable multicast trees to provide increased scalability, efficiency, and practicality. The present invention satisfies those needs, as well as others, and overcomes the deficiencies of previously developed multicast protocols.

BRIEF SUMMARY OF THE INVENTION

The present invention comprises a solution for message ordering services integrated with a tree-based, concurrent, reliable multicast. Multicasting is essential for efficient one-to-many communications in a computer network. The Internet infrastructure and applications are increasingly being adapted to multicasting and require reliability and effective ordering of message transmissions. While reliability has been extensively researched in recent years, a solution for integrated ordered delivery over the most common delivery geometries (trees) within the Internet has been lacking, and is provided within this present invention.

According to an aspect of the invention, ordering is performed on a tree, instead of a ring, as proposed by prior work on reliable multicast protocols. The ordering process is performed on a mirror copy of an underlying shared multicast tree and supports ordering of messages from rapidly changing sources, for overlapping receiver groups and for anonymous hosts.

Ordering can be deployed more practically as a middleware component for any application needing ordered delivery, as opposed to requiring each application to provide its own, independent, ordering service. Ordering within the present invention is distributed among many nodes across the tree and thereby achieves improved scalability and efficiency.

By way of further example, and not of limitation, the invention provides ordering of messages for applications using IP multicasting within the Internet. A novel taxonomy of ordered broadcast and multicast solutions and a basic comparison of message complexities indicates that using the underlying infrastructure of trees predominant in current IP-multicasting solutions achieves the same or better efficiency in comparison with previous approaches. Support for ordering below the application level allows more rapid design and deployment of applications depending on ordered multicasting. Previous work on reliable multicasting indicated that shared trees provided the most efficient infrastructure for reliable data dissemination. Shared trees allow for concurrent usage of the same tree geometry by multiple sources disseminating data to different groups on the tree. The tree-based ordered multicasting (TOM) protocol of the present invention adds total ordering of packets to concurrent reliable multicast, wherein the ordering operation is distributed across the nodes within the network. A number of features are provided within the TOM to facilitate the ordering operation. A mirror copy of a logical tree geometry is utilized to provide concurrent, reliable multicasting as an infrastructure for ordering. Aggregation of ordering primitives is performed to minimize control traffic among nodes, in resemblance to a two-phase ordering protocol, however, it is deployed across the tree. Aggregation entails the ordering and combination of messages destined for the same receivers, performed at hosts on the delivery path. TOM utilizes address extensions assigned to hosts for self-routing of messages and dynamic distribution of the ordering processing load. By using the address extensions, TOM also supports total ordering of messages for anonymous and overlapping receiver groups in shared trees, and can be extended to support causal and atomic ordered multicast. The use of causal and atomic multicast can also be supported with minor changes in the protocol delivery semantics. The ordered multicast, as described and specified with the TOM protocol, can be implemented in either software or hardware.

An object of the invention is to provide ordered multicasting for tree-based multicasting networks.

Another object of the invention is to provide ordered multicasting which employs distributed ordering responsibilities across the tree.

Another object of the invention is to provide for ordered multicasting with improved scalability, resiliency, and efficiency, of the concurrent transmissions.

Another object of the invention is to provide ordered multicasting with integrated reliability provisions and ordering in the same topology and delivery process.

Another object of the invention is to provide ordered multicasting in which extra computations and maintenance of a propagation graph are not necessary.

Another object of the invention is to provide ordered multicasting that allows ordered concurrent transmissions from rapidly changing sources on the same tree.

Another object of the invention is to provide ordered multicasting in which address extensions allow dynamic election of any node on the tree to order messages destined for the same group.

Another object of the invention is to provide ordered multicasting in which the address extensions support ordered delivery to anonymous hosts and overlapping receiver groups in shared trees.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 4 is a pseudocode listing of TOM procedures according to aspects of the present invention, showing send, receive, and casting procedures.

DETAILED DESCRIPTION OF THE INVENTION

Figure 2:
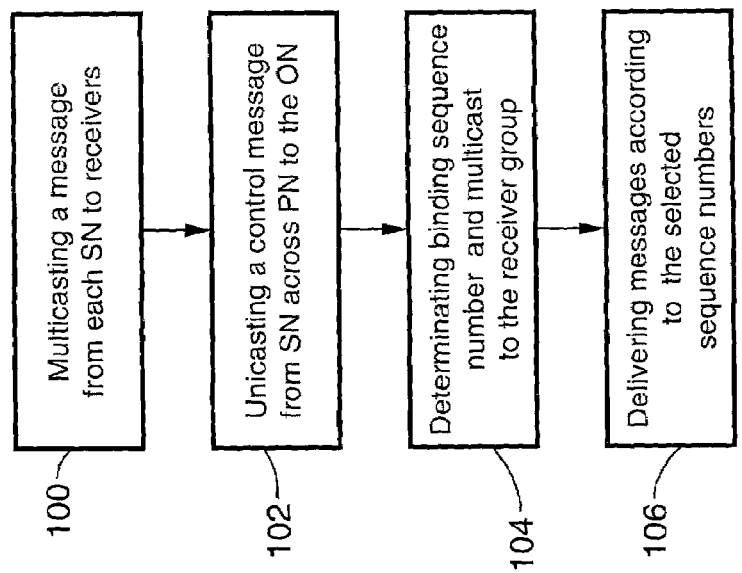
FIG. 2 is a flowchart of multicasting operation according to an embodiment of the TOM protocol of the present invention.
Figure 1:
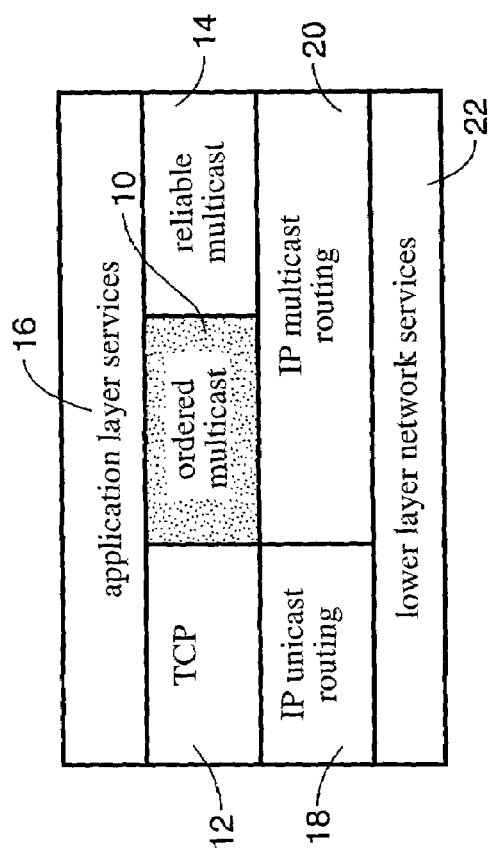
FIG. 1 is a protocol stack diagram of ordered multicasting according to an embodiment of the present invention, as shown as middleware within the host software.

For illustrative purposes the present invention will be described with reference to FIG. 1 through FIG. 6. It will be appreciated that the apparatus may vary as to configuration and as to details of the parts, and that the method may vary as to the specific steps and sequence, without departing from the basic concepts as disclosed herein.

1. Introduction

IP multicast communication generalizes the point-to-point and broadcast communication model to multipoint dissemination of messages. A source is required to transmit a single stream of packets to the network interface whereupon those packets are transparently replicated along their transmission paths to the receivers. This form of communication is indispensable for networked applications with high-volume data transfer, such as distributed software updates, news casts, video-on-demand, and interactive applications which include distributed simulations and tele-collaboration systems. Data handled by these applications fall into two categories, continuous media streams and non-real-time data. Real-time data delivery, such as utilized for delivering video or audio streams, is typically best-effort and unordered, but must observe deadlines to be useful for an application. Non-real time packets carry discrete data, and may require reliable, ordered, delivery based on the application semantics.

Changes in datagram routing or transmission errors may cause packets to arrive at their destination out of sequence. Disordered delivery of packets in a distributed application may result in different views of the group state at end hosts. Ordering of messages compensates for the lack of a global system state and the effects of asynchrony, unpredictable network delay, and disparities in host processing in distributed communication, while its use warrants that destination processes observe the same order of reception of messages. The ordering of messages is complemented by reliability and atomicity. Reliability guarantees that messages eventually arrive correctly at their destinations, while atomicity guarantees that a message is received by all members of a multicast group or none.

Consider a distributed interactive simulation with many moving, interacting entities, wherein a message $m_1$ is reliably multicast from source $s_1$ to receiver group $Rec_1$, and $m_2$ is reliably multicast from $s_2$ to $Rec_2$. A host which belongs to $Rec_1$ may receive message $m_1$ before $m_2$, while another host belonging to both groups may receive the messages in the opposite order. Correct operation of the simulation system requires not only that the input stream is equivalent for all replicas, but all input events have to be delivered to the replicated instances of shared applications in the same order. An ordering protocol must intercept, or preferably be integrated within, the delivery process to guarantee the described consistency.

The majority of current reliable multicasting solutions lack associated ordering services. In a performance comparison of such protocols, entailing both sender and receiver initiated protocols, ring or tree-based protocols, and tree protocols with negative acknowledgments and periodic polling, it was determined that the latter protocol type was the most scalable and efficient approach known to date among deployable systems. Based on these observations, our objective is to examine how ordering services can be integrated with reliable multicasting, in particular with tree-based protocols, preserving scalability and efficiency. The present invention provides a solution for this problem using staggered ordering of messages on their delivery paths from sources to receivers in the reliable multicast tree, which is also used for logical connectivity between hosts for the purpose of error recovery. In contrast to earlier work, the protocol of the present invention does not require construction of a separate logical propagation graph or global clock synchronization, and ordering is distributed across nodes on the delivery paths between sources and receivers in the multicast tree.

2. System Model and Assumptions

The present network model =(H, C) consists of a set of k hosts H and communication links C, communicating via message passing in the absence of physical clock synchronization. A host is equated with the processes running on it. A multicast group is a set of k hosts in a network of H hosts, which is addressable collectively by a unique group address.

Message dissemination is assumed to be genuine multicast, such as wherein a source sends a message m once to the network interface in a multicast enabled backbone, which replicates m at multicast enabled routers on its path to $r \leq n$ receivers. This stands in contrast to most prior work on ordered multicasting which assumes either unicast, where a message must be sent r times from a source to the network interface to reach r< n receivers, or broadcast, wherein all n hosts in the network are addressed and designated receivers must filter out messages targeted at them.

Four cases of group connectivity can be observed, (1) from a single source s to a single group g, denoted as (s, g); or (2) to multiple groups G, (s, G), or from multiple sources S to; (3) a single group, (S, g), or (4) to multiple groups, (S, G). Cases (1) and (2) have a trivial solution wherein sequence numbers fixing the ordering relation are added to outgoing messages at the source and are delivered in that order at the destinations. Cases (3) and (4), however, are more difficult to implement, because sending messages from one host is independent from the other hosts, whereas reception of the same messages may be interdependent and destination groups may overlap.

The present methods are directed toward totally ordered multicasts from multiple sources to multiple receivers or receiver groups. It is assumed that hosts do not fail and that network partitions do not occur. Overlapping groups are also considered in relation to the present protocol, as these were a focal point in previous work on ordered multicast. Hosts contained within the intersection of two overlapping multicast groups should receive a message only once if the message is sent to both groups.

In total order, two messages $m_1$ and $m_2$ are sent to a receiver set Rec in the same relative order. For example, if two sources, A and B, send messages $m_1$ and $m_2$ to receiver groups $G_1$ and $G_2$, respectively, then hosts in both groups, in particular in the intersection $G_1 \cap G_2$, should receive both messages either in the order $(m_1, m_2)$, or $(m_2, m_1)$. Atomic order demands that either all or none of the hosts in Rec receive the messages. A weaker notion of total order is causal order, based on Lamport's "happened before" relation. While a causal precedence relation between two messages preserves their sending order at delivery time, messages without causal linkage may still be delivered to different hosts in different order. Logical point-to-point channels between any pair of hosts are assumed to be FIFO to prevent an earlier message by the same process from being overtaken during delivery by a later message. If not provided by the network layer, FIFO-delivery over non-FIFO channels can be implemented by having the source process add a sequence number to its messages and let destinations deliver according to such sequence numbers.

Finally, it is assumed that a reliable, unordered multicast protocol is running at every host providing reliable delivery of a message to all operational hosts in a target multicast group. Ordered multicast should be host minimal, wherein no other hosts are affected by multicasting of the message other than the source and receivers, and message minimal, wherein the message size is a function of the size of the receiver set and not of an entire session or network. It will be appreciated that total order multicast according to a broadcast model is not host minimal. Ordering is preferably provided as middleware which complements reliable multicasting to motivate reusable coding and easier deployment, which is exemplified in FIG. 1. It can be seen in the figure that the ordered multicasting routines 10 are situated in the same layer as TCP services 12 and the reliable multicasting protocol 14 which is below the application layer services 16, and above the layer containing both IP unicast routing 18 and IP multicast routing 20 which sit above the lowest network services layer 22. The approach may be easily justified from the observation that many networked multimedia applications are based on similar media characteristics and delivery semantics. In contrast, applications such as the MBone whiteboard tool provide application-level ordering of messages.

3. TOM Protocol Description

The "Tree-based Ordered Multicast" (TOM) protocol relies on an underlying reliable multicast tree for propagation of ordering information besides acknowledgments and retransmissions. This tree is assumed to approximate the underlying multicast routing tree, which for the Internet is built using various protocols such as DVMRP, CBT or PIM-SM. For the following description, it is assumed that hosts do not fail and that network partitions do not arise. Trees may be constructed per source, whose cost may only be properly amortized for long-lived or large-volume transmissions, or dissemination can be based on a shared tree, across which acknowledgments, preferably negative, are relayed between hosts. In such a tree, sources may change frequently, only one collective infrastructure must be maintained, and a source need not know the identity of all receivers in the multicast group. However, the paths from sources to receivers may be suboptimal.

Although a reliable multicast protocol should be utilized with the present ordering mechanism, it is unimportant for the present description to specify a particular multicast protocol. The use of source-based or shared dissemination is also not crucial, however, the present invention will exemplify the operation of TOM to provide total order in a shared tree. An important concept in TOM is to multicast a message from a source to a receiver set combined with sending ordering information for the message, such as sequence numbers or time-stamps, to a common node on the tree which has been elected as the ordering node for this receiver set, or multicast group. The ordering node is responsible for sequencing the messages assigned to it and multicasts binding sequence numbers for final delivery to the receiver set, wherein the pending messages are to be delivered. TOM can be deployed in the form of an API accessible to applications with ordering needs.

3.1. Data Structures

A host in the multicast tree is either a source node (SN), an extra node (EN), a primary node (PN), an ordering node (ON), or a receiver node (RN). Since every host in the multicast session runs the ordering protocol, roles are assumed on-the-fly and no dedicated hardware is needed. The source node, SN, emit messages to one or more multicast groups in a session. Each extra node, EN, is a node that is not a member of the receiver set for a message, relaying messages upward or downward in the tree without participation in the ordering process. Primary nodes, PNs, are hosts on the upward ordering path from source node, SN, to ordering node, ON, aggregating control messages in local order and forwarding revised sequence numbers up in the tree. The ordering node, ON, is the sequencer node for a message, gathering sequence number bids set en route by primary node, PN, deciding on a globally valid number, and multicasting the message to the receiver set with a final and binding sequence number directive. Sources can be ordering nodes, ONs, as well. Receiver nodes, RNs, are recipients of message which are delivering them according to an ordering-node, ON, sanctioned sequence number. Nodes can be source nodes, SN, for their own messages and assume all other roles for other messages. Edges within the acknowledgment-tree point from child nodes to their parent nodes.

A TOM message m=($m^h$, $m^b$) consists of a control header $m^h$ and body $m^b$, with $m^h$=(SN_id, Rec, Seq#, ts, of) where SN_id is the source node identifier, Rec is the target receiver set, which is either a multicast group, or a collection of individual node identifiers; Seq# is the sequence number used for ordering, ts is an optional time-stamp for ordering in response to timing information at the nodes, and of is the ordering flag indicating that a binding sequence number for the message has been set, while $m^b$ contains the actual data stream.

Each node maintains two message windows for ordering, with a window for unordered messages (uw), which have been received but whose delivery is pending; and an ordered messages window (ow) for messages, which are correctly ordered and can be delivered to local processes. The sizes of these buffers are limited by the number of hosts in the largest multicast group known at the time of buffer allocation. Each host programs its local network interface to subscribe to multicast packets on the same local network, or to receive packets from routers based on IGMP information.

3.2 Operation of TOM

FIG. 2 illustrates the general operation of the TOM protocol for ordering multicast messages according to four steps: first, a message multicast from each source node, SN, to receivers as shown by block 100; next a control message unicast from a source node, SN, across a primary node, PN, to the ordering node, ON, for the designated multicast group or transmission as per block 102, where primary node, PN, aggregates messages from their subtrees and hence staggers the ordering process upward within the tree; then, determination of a binding sequence number for this message and a multicast to the receiver group as shown in block 144; and finally, the delivery of messages at end hosts according to the agreed-upon sequence numbers as per block 106. The goal is to deliver messages consistently in an order that all hosts agree to, without requiring sources to know the constituency of the receiver set. Multicast group information is assumed to be available from a session directory service.

To allow selective addressing of hosts and dynamic election of an ordering node, ON, the TOM protocol introduces a labeling mechanism recently proposed for reliable multicast in the tree-based protocol Lorax (see, e.g., B. N. Levine et al., "The case for reliable concurrent multicasting using shared ack trees", Proc. ACM Multimedia, pages 365–376, November 1996), and for multicast routing. Labels allow for open-ordered multicast, such as the addressing of specific nodes in the tree without the need to manifest a separate multicast group or to reveal IP-addresses, wherein self-routing of messages to their destinations is facilitated based on prefix comparisons. Each node i in the acknowledgment-tree is labeled with a unique label l(i), which is the prefix of all children of i. The label alphabet is preferably implemented with a set of symbols having a defined order, such as integers or letters with lexicographic order, with the alphabet cardinality corresponding to the tree branching factor B. The heuristics to select an ordering node, ON, is as follows: for each set of messages destined to a particular multicast group, or set of hosts, an ordering node, ON, is elected, such as by virtue of being the node whose label is the longest common prefix among all node labels in the receiver set. Each ordering node, ON, gathers sequence number bids set en route by primary nodes, PNs, deciding on a globally valid number, and multicasts the respective message to the receiver set with a final and binding sequence number directive.

Figure 3:
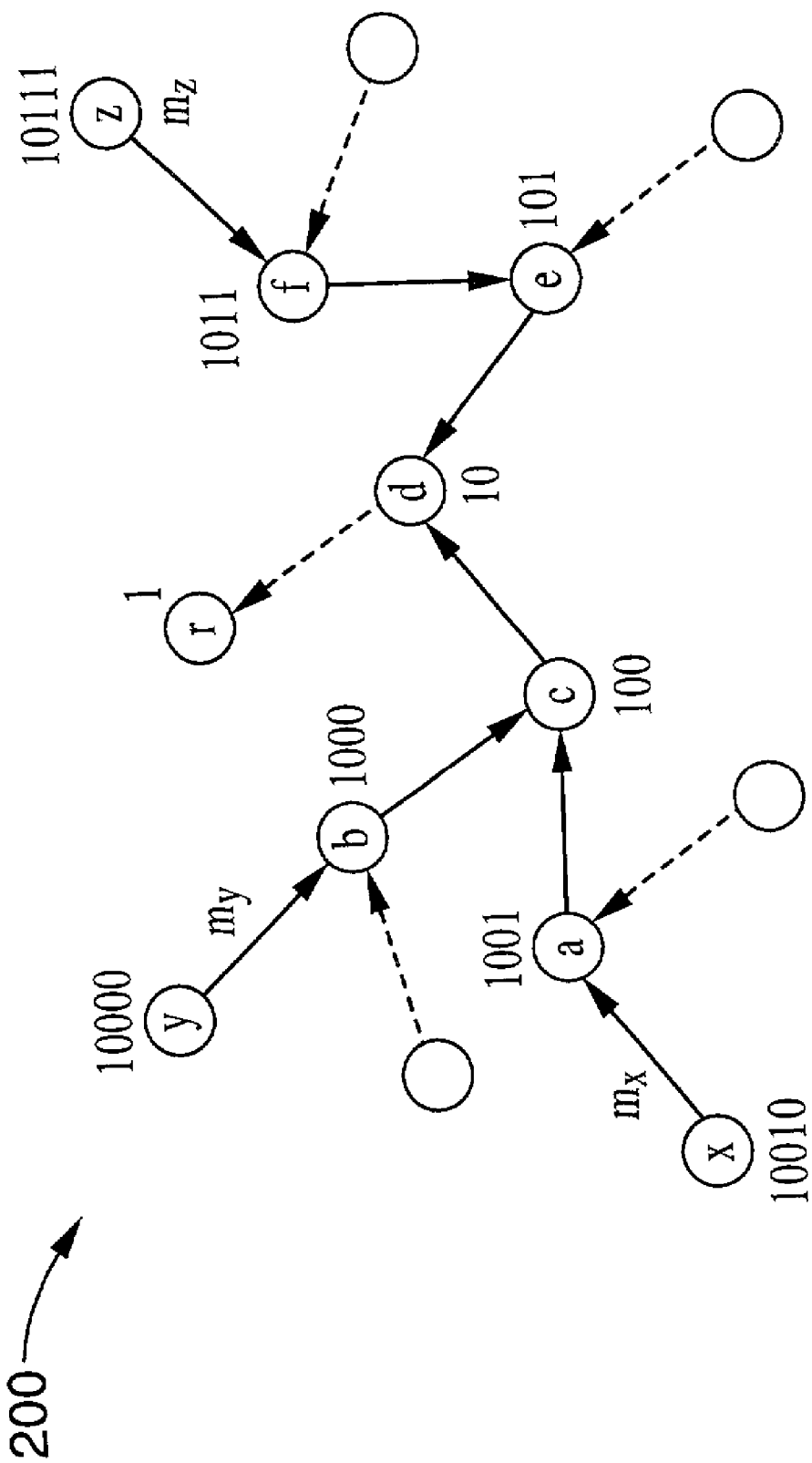
FIG. 3 is a topology diagram upon which the operation of the TOM protocol according to an embodiment of the present invention is exemplified.

FIG. 3 illustrates the mechanics of the TOM protocol exemplified on a multinode tree 200. Node r, as the root of the tree, carries label 1. Node d is the only child in this multicast session which carries the prefix of its parent r, concatenated with its own index of "0". All three sources of messages, nodes x, y, and z, have labels of length five, being positioned at depth five in the tree. An important principle in using labels for the ordering procedure is to create a confluence of messages at strategically optimal nodes in the tree for ordering a number of messages arriving in the same time window. Rather than depending on a statically assigned ordering node, the ordering node, ON, is dynamically-selected per transmission, preferably as the node having the longest common prefix among the sources of pending messages in the targeted multicast group, without the need to pass an election token among nodes.

Consider the case that nodes x, y, and z have messages to be multicast to a multicast group Rec={x, y, z, a, b, c, d, e, f }. Each source multicasts its message to Rec, where it is entered in the order of collective arrival into uw. Control messages $m_x^h$ and $m_y^h$ are routed from source nodes, SNs, x and y, respectively, across their parents to the first common prefix node c, which are intermittently ordered at c with revised sequence numbers, and percolated up in the tree to node d, where message header $m_x^h$ is also arriving. At any node on the path, a bitmask operation on the matching prefix indicates which messages must be up-routed, or handled locally. At node d it is determined that its label "10" matches the longest common prefix of SN labels l(x), l(y), l(z). Hence, ordering nodes, ONs, ($m_x$, $m_y$, $m_z$)=d wherein node d sequences and multicasts the updated message headers to Rec to signal that the associated messages can be delivered. Once each receiver in Rec receives the ordering information per message m with of=true from the ordering node, ON, it shifts m into the ow, where the heading element is first delivered to end-processes.

Similarly, messages to a multicast group located in a left subbranch of the acknowledgment tree can be handled locally by the ordering node, ON, of that group, without affecting any nodes in other segments of the tree. The only overhead incurred in the ordering process is the control message unicast from source nodes, SNs, to some ordering node, ON, plus one multicast to the receiver set. Total order is hence achieved in a diffusing computation, wherein the ordering process is carried out along with the message multicast, however, neither are receiver nodes, RNs, burdened with sorting out the messages, and they do not require knowledge of the identity of the ordering node, ON. Through the percolation process from source node, SN, to ordering node, ON, usage of the same sequence number for a specific message to all receivers in a multicast group is guaranteed.

Labels allow open ordered multicast, such as the addressing of specific nodes in the tree with an ordered message sequence without the need to manifest a separate multicast group, and for self-routing of messages to their destinations based on prefix comparison. FIG. 4 sets forth an embodiment of the ordering algorithm 300 of TOM( ) that an ontree host i may utilize to send a message m totally ordered to a receiver set Rec, wherein hosts are assumed to carry prefix labels. Procedure TOM_send( ) multicasts a message to the receiver set and unicasts the control header towards the dynamically elected ON; TOM_cast( ) self-routes messages to a receiver based on prefix labels; and TOM_receive( ) checks, whether a node is EN, PN, ON, or RN and takes action accordingly.

Consider the special case of ordering with this mechanism, in response to messages which are to be sent to two different, but overlapping, multicast groups. An example of the overlapping groups are $G_1=\{a, b, c\}$ and $G_2=\{c, d, e, f\}$ wherein $G_1 \cap G_2 = c$. Nodes in each group must receive a given message sequence in total order, and node c shall not receive contradictorily ordered messages. This situation can be resolved, if individual membership within the target groups is known. Instead of choosing the node with the longest common prefix as the ordering node, ON, the nodes with multiple membership become the ordering cores for a transmission, and prescribe their sequencing decisions to their respective ordering node, ON. In the present case, node c will be instrumental in informing node d about the sequence in group $G_1$, such that node d can thereby construct a sequence compatible with $G_2$.

While total ordering of messages within one or more destination multicast groups is ensured, causal order among messages is not preserved in the above algorithm. To provide causality, the sequence numbers of messages to be ordered must incorporate encoded causal dependency information before reaching the ordering node, ON. By way of example, the encoding of causality information may be achieved by utilizing Lamport clocks which are maintained by all nodes belonging to a multicast group, and updating sequence numbers in the staggered ordering process to preserve the causal relations. To implement atomicity in delivery, that is, either all receiver nodes, RN, within Rec(m) will receive message m, or no message at all. Another message exchange must be introduced between receiver nodes, RNs, and ordering nodes, ONs, such that all receiver nodes, RNs, signal their reception of m and $m_h$ to the ordering node, ON, and the ordering node, ON, is required to send another ok_to_deliver(m) signal for the receiver node, RN, to collectively proceed with delivery.

Resilience is another important aspect in TOM operation that is now briefly discussed. Ordering can be linked with several types of reliability, including (1) no guarantees on reliability of ordered deliveries, (2) the assumption of only inconsistent deliveries with failed hosts, (3) inciting rollbacks at operational hosts to repair inconsistent deliveries, and (4) the assumption that inconsistencies do not occur. Furthermore, another set of choices address the requirement to deliver a message, and the recipients to which the delivery guarantee is to be extended. In the event of host or link failures, the ordering tree may be partitioned into subtrees, each of which may continue to run TOM. The disappearance of an ordering node, ON, will be preferably remedied by replacement with the next common node in the destination set according to the label semantics. In operational subgroups, the semantics of reliable delivery is preserved for all multicast operations. Failure and recovery events must be made known to all operational hosts in an ordered fashion. Partitioned subbranches of the ordering tree may rejoin as soon as communication paths between them are reestablished. A link failure is detected, when a host fails to probe a neighbor node on the tree before expiration of a local timer. A host failure is detected, when a host with a pending queue of messages does not receive an expected message within a given timeout period.

4. Taxonomy and Performance Comparison

Figure 5:
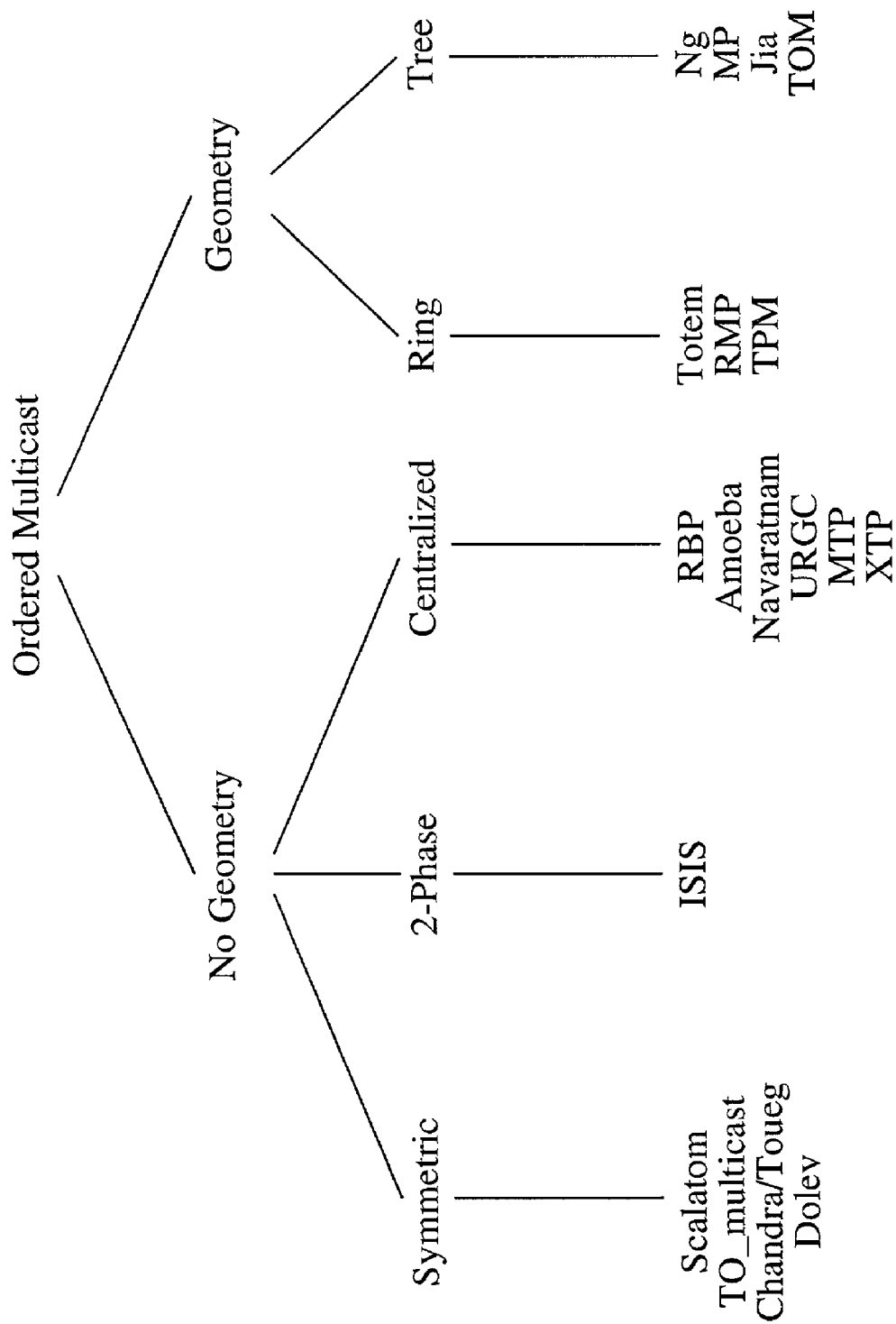
FIG. 5 is a tree-diagram showing the classifications of ordering paradigms wherein the TOM protocol according to the present invention, showing the TOM protocol classified as a tree-based geometry.

Predominant ordering paradigms are classified using reliable broadcast or multicast into two main classes, as depicted in FIG. 5, wherein (1) geometry-independent protocols include symmetric, two-phase, and centralized solutions; while (2) geometry-dependent protocols include ring-based and tree-based solutions. The following describes these paradigms and analyzes performance metrics to provide a performance analysis with the TOM protocol which operates on geometry-dependent tree-based protocols.

A number of multicasting schemes may involve all hosts in the ordering process in a decentralized way, using message stability properties, in contrast to solutions that burden one or a few of the hosts with the responsibility to order messages on behalf of the hosts in a multicast group. The main problem in the first case is to reach consensus among hosts on ordering patterns, the problem in the second case is to elect sequencer nodes. The present taxonomy contrasts the distinction between symmetric and token-site algorithms proposed by Rodriguez et. al. ("Totally ordered multicast in large-scale systems", Proc. of the $16^{th}$ Int. Conf. on Distributed Computing Systems, pages 503–410, May 1996), which only accommodates symmetric protocols utilizing token-passing methods, and does not provide for tree-based ordering.

The processing of load X is evaluated at involved hosts and the message overhead M required to successfully multicast a message, in order, from a source node to all receivers. IP-multicast is assumed as the dissemination model for all schemes, although all schemes except TOM have been proposed in broadcast systems. The goal of this comparison is not an elaborate modeling of the many possible nuances and optimizations of ordering schemes in conjunction with reliable multicast, but rather a plain comparison of the fundamental working structure of ordering solutions. To this end, the evaluation does not include loss probabilities and assumes that all schemes consistently use sender-initiated or receiver-initiated error recovery. Sender-initiated models place the burden for processing acknowledgments and requests for corrupt or lost packets on the transmission source, opposite to receiver-initiated solutions, wherein the retransmissions are performed in local groups among receivers and sources that are contacted only in the case of unrecoverable packet-loss. It should be appreciated that receiver-initiated protocols achieve improved scalability, largely due to the fact that sources are generally contacted only in the case of packet loss.

The notation used is as follows: s is the number of sources transmitting a message m destined for the same receiver, or receivers, at any given time, wherein each sender is assumed to also be a receiver; r is the number of receivers of message m in the receiver set Rec(m); $X_f$ is the time required to feed a packet from a higher protocol layer; $X_p$ is the time to process the transmission of a packet, including the time required for retransmissions; $X_\#$ is the time to process a sequence number check; $Y_p$ is the time to process a newly received packet; $Y_f$ is the time to deliver a packet to an end process; $X^w$ is the processing overhead per message in protocol w={S, 2P, C, R, $T^{MP}$, $T^{MG}$, $T^{TOM}$}. M represents the number of transmissions required for all receivers to receive a message in a given order.

4.1 Geometry-Independent Protocols

Reliable broadcast solutions are largely designed for fault-tolerant, asynchronous, distributed systems which utilize protocols that are geometry-independent, for example wherein all hosts are assumed to be fully connected with one other, and wherein the routing between hosts does not presume any prearranged host geometry. Symmetric, two-phase, and centralized solutions are subsumed under this geometry-independent paradigm. Centralized ordering may also be classified as a star-geometry, but the central node is typically chosen from all the nodes in an ad-hoc manner based on a predetermined election or token-passing scheme.

4.1.1. Symmetric Ordering

In symmetric ordering schemes (S), all hosts participate in the ordering process in a decentralized manner, analogous to a voting process, using message stability properties. A source node (SN) disseminates messages reliably to all hosts, which assigns a timestamp to each message and places it in a pending buffer; for each message m. Participant hosts (SN and RN) agree on a unique order number using timestamp information by running a consensus protocol. Messages with an assigned order number are shifted to the delivery queue and delivered to end processes in the globally binding order. It will be appreciated, therefore, that the number of messages to be exchanged is a function of the number of hosts within the system that are involved in the ordering process. With $X_C$ denoting the extra cost for the consensus protocol, the expected overhead of a generic symmetric protocol at the source node (SN) and receiver node (RN) is given by:

$$X_{SN}^S = X_f + rX_p$$

$$X_{RN}^S = s(Y_p + X_\# + rX_c + Y_p) \quad (1)$$

Utilizing broadcast communication, a source node sends a message to r−1 receivers, which in turn send r−1 messages to agree on the final sequence number, wherein $M_{BC}=s((r-1)+r(r-1))$, that is $O(sr^2)$ for s sources. With multicast and r<n receivers, M=s(1+2r), that is one multicast message to all receivers, one multicast per each of the r receivers to each other, and one timestamp sweep from all receivers to the source. Protocols with fault-tolerance measures may incur significantly higher cost factors.

4.1.2. Two Phase Ordering

Four communication steps are required when utilizing two-phase ordering (2P). A source sends a message m to a multicast group, whereupon each receiver assigns a priority number to the message, places m as pending in its local queue, and returns the priority number to the source. The source selects the highest number and sends it to all receivers, thereby replacing the original number with the new one, tags the message as deliverable, reorders the queue, and delivers the messages at the head of the queue. Expected overhead at the source node (SN) and the receiver node (RN) is given by:

$$X_{SN}^{2P} = X_f + r(Y_p + X_\# + 2X_p)$$

$$X_{RN}^{2P} = s(2Y_p + X_\# + X_p + Y_f) \quad (2)$$

If it is assumed r≧s, then $X^{2P} = \max(X_{SN}^{2P}, X_{RN}^{2P}) = O(r)$. Given one message multicast from s sources to r receivers, a number of control messages r with priority numbers are sent back to each source, while a final control message must be multicast from the source to the receiver set for each message, such as M=s(1+r).

4.1.3. Centralized Ordering

In centralized ordering (C) a source node (SN) transmits a message m to a sequencer host, which assigns a unique number to m, and forwards it to the receiver set Rec(m), where it is ultimately delivered to end-processes in the order prescribed by the sequence numbers. The sequencer role may rotate among hosts. The expected overhead at SN, ON, and RN is thereby given by:

$$X_{SN}^C = X_f + X_p$$

$$X_{ON}^C = s(Y_p + X_\# + rX_p)$$

$$X_{RN}^C = s(Y_p + Y_f) \quad (3)$$

Hence $X_C = O(sr)$, and M=s+r, consisting of s messages from sources to the ordering node (ON), and one multicast per message from ordering node (ON) to all receivers. If the source node (SN) is the same as the ordering node (ON), then one step is eliminated.

4.2 Geometry-Dependent Protocols

Geometry-dependent protocols presume a specific host topology to route ordering information.

4.2.1 Ring-Based Ordering

In ring-based ordering (R) a logical ring imposes a transmission path between hosts, wherein each host is only required to communicate with its predecessor and its successor in the ring. To multicast a message, a host must possess the token. The token contains requests for messages to be resent and the highest sequence number for any message broadcast on the ring. Each host maintains an input buffer containing pending messages with assigned sequence numbers. On receipt of the token, the host completes processing of the messages in its buffer by adjusting sequence numbers, resends messages requested in the token, updates the token information and forwards the token. Messages are sent to end processes when marked as deliverable. Each source node (SN), as a token-site, assumes the role of an ordering node (ON). With $X_{tk}$ indicating the token transfer time, the expected overhead at the source node (SN) and the receiver node (RN) in a single ring is given by:

$$X_{SN}^R = X_f + X_p + r(Y_p + X_{190} + X_p) + X_{tk}$$

$$X_{SN}^R = s(Y_p + X_\# + Y_f) \quad (4)$$

Hence $X^R = O(r)$, if r>s, and the minimum message overhead is given by M=2nlk, where 2n is the number of token transfers required to accept k multicast messages in a ring of n nodes. Assuming that k=1 with s sources, and despite r<n receivers, M=2sn.

4.2.2 Tree-Based Ordering

For tree-based ordering (T), the MP protocol and the metagroup approach (MG) are compared with TOM. It will be appreciated that these current tree-based reliable multicast protocols do not provide ordering. Common to MP, MG, and TOM is the element of distributing the ordering responsibility and load across several nodes on the tree. The IMP and MG protocols utilize group membership information to cluster nodes for optimized message delivery, in contrast to which the TOM protocol utilizes the end-to-end multicast topology.

The MP protocol include two operating phases (1) the transmission from the source to a primary host, and (2) the transmission from this host to the receivers. MP builds a plethora of propagation trees, wherein hosts in the intersections of multicast groups are chosen as hop nodes, such as the roots of subtrees. A message is first sent to these primary hosts, and then propagated downward in the tree toward the receiver hosts, being ordered on their propagation path, and finally unicast to the receiver hosts. The MG protocol clusters hosts from overlapping multicast groups into metagroups, which do not overlap. Each group has a primary metagroup (PM), and in each metagroup one member is assigned to be a manager. Metagroups are organized in a plurality of propagation trees, such that the PM of a group is the ancestor of all other metagroups of the same group in the tree. Messages destined to multicast group G are first sent to the primary node PM(G), which propagates the messages along the tree to all other metagroups, which are subsets of G. The manager of a metagroup broadcasts a message to other members in its metagroup.

The drawback with the MP and MG protocols is the need to compute a logical propagation or metagroup tree per-source as overlays to the end-to-end geometry, which requires that in order to construct such a tree, the computation host, or hosts, must recognize the membership of all groups. This approach is operable only for closed multicast and static groups, and the cost may be rationally amortized only for long-duration transmissions between hosts. The processing overhead common to all tree-based schemes is:

$$X_{SN}^T = X_f + X_p$$

$$X_{ON}^T = B(Y_p + X_\# + X_p)$$

$$X_{RN}^T = Y_p + Y_f \quad (5)$$

Hence generally $X^T = O(B)$, where B indicates the branching factor of the tree. With multicast, $M^{MP} = s(1+d)$ messages are required, with one message from each of the s sources to the primary destination in the subtree, and one broadcast at each level of the subtree, where d is the subtree depth. The MG protocol has three operational phases and requires one message to PM (G), d messages to the managers of the deepest metagroups at depth d in the subtree, and another k messages to the members of the k metagroups containing the target multicast group, wherein $M^{MG} = s(1+d+k)$.

It will be appreciated that TOM requires a multicast from s source nodes (SNs) to the receiver set, and p unicasts from the source node (SN) to the ordering node (ON), where p is the average path length, and one final multicast from the ordering node (ON) to the receiver node (RN), wherein $M^{TOM} = s(2+p)$.

4.3. Results and Comparisons

Table 1 summarizes expected message costs and delays for the described protocols. Centralized and two-phase approaches incur only two, and three message exchange phases, respectively, however, the messaging is concentrated on specific hosts in the session which are subject to failure and bottlenecks. Rings engage all hosts in a session in the transmission process, even when a source and multicast receiver group constitute only a small portion of the entire session. Trees allow for selective engagement of hosts on those subbranches or local groups, which are actually affected by the message processing.

Figure 6:
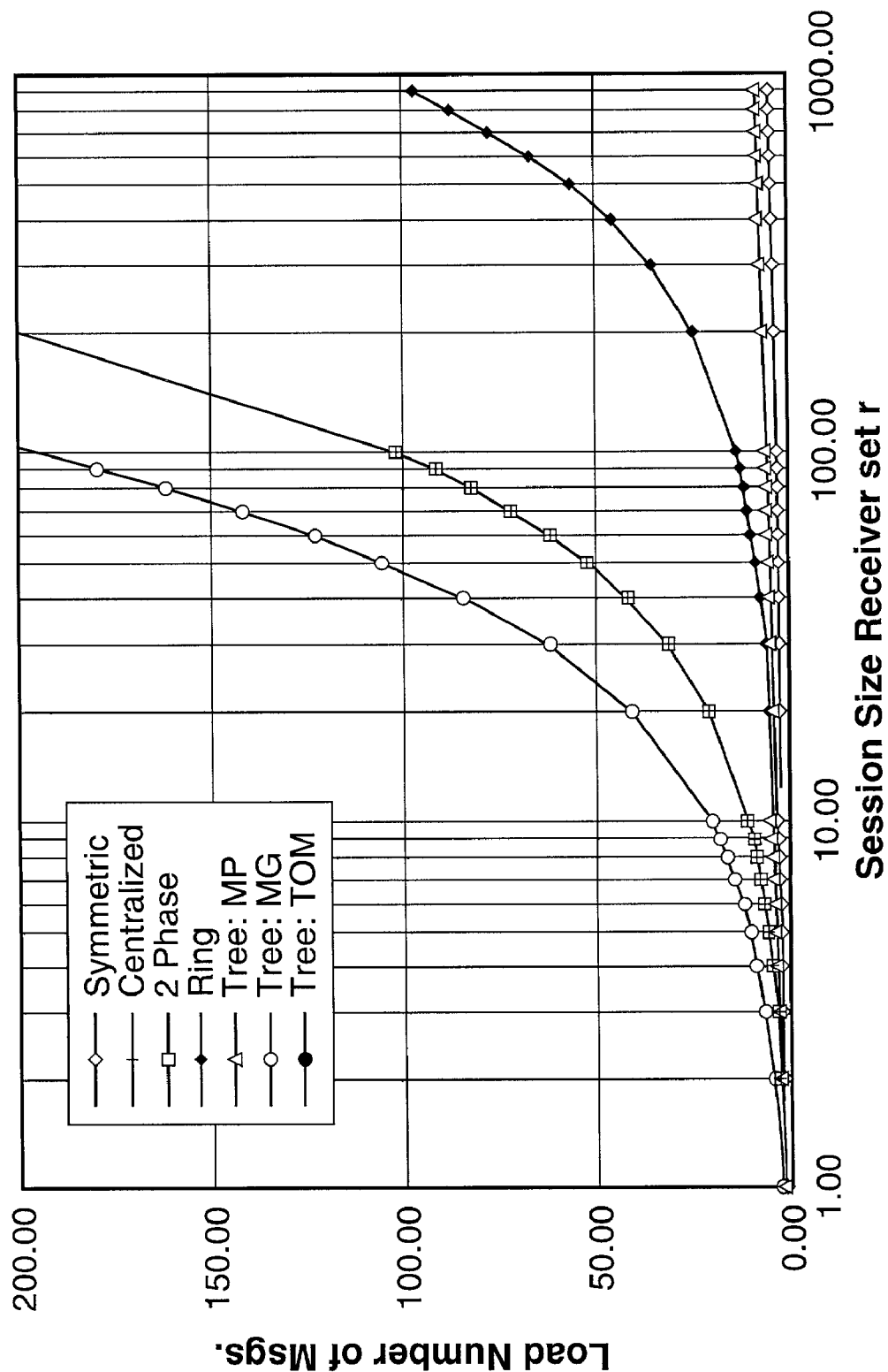
FIG. 6 is a graph of multicast message costs which compares a number of protocols, including the TOM protocol according to an embodiment of the present invention.

It is assumed that there are as many sources as receivers, r=n and s=1. In the graph the cost to compute and maintain the propagation infrastructure is ignored, although the anticipated overhead for the MG and MP protocols is substantial in contrast with the TOM protocol which simply relies on a given acknowledgment tree. The session size is varied between n=[1,1000], with r=n/10 as the average size of a receiver multicast group. The tree-depth of the MP protocol has been projected between d=[1, 8] for simulations with n=200 and average group size g=[5, 40]. The tree depth for a metagroup tree has been projected between d=[1, 5] for up to 40 metagroups with g=50, and an overlapping degree of 10. It is also assumed that each source sends only one multicast message per transmission cycle. Simulations for the Lorax protocol have indicated that optimal ACK trees are built when each node supports at least B=5 neighbors. To provide a baseline comparison, the average depth of a subbranch in a tree according to the MP and MG protocols is chosen as $d = \log B^r$, where B=5, depicts the average node degree. The average path length according to the TOM protocol is chosen as p=h/2, because roughly half of the height h of the tree needs to be traversed in converging on a particular ordering node (ON). It should be noted that a message comparison provides a limited view on the relative performance of the protocols, because parallelism in message processing, the processing overhead at various nodes, and the shape of the tree would need to be considered in a more precise way. However, concentrating on M alone is sufficient to express fundamental differences between the approaches. FIG. 6 plots the multicast message cost of the various schemes under given assumptions.

The results only represent performance of the discussed protocols under one to particular scenario, namely genuine multicast utilizing a single transmission source. The multiple source case would reinforce that the throughput of a generic tree-based protocol for ordered reliable multicast scales better with receiver set due to locus and execution of sequencing. Symmetric methods exhibit the least amount of scalability, as a result of requiring that all nodes be involved in processing messages from all other nodes. If all nodes broadcast at the same time, latency may be low, but a consensus protocol must be run. Two-phase, centralized, and ring solutions have similar message overhead. The use of the ring solutions, however, may permit higher-concurrency, although a drawback arises for large sessions due to latency increases. The centralized ordering method is reasonably efficient when limited to a few hosts, however, it is subject to potential bottlenecks and results in a single point of failure, which is particularly risky when utilized for large sessions. A logical hop between hosts within the MP and MG protocols may require multiple hops across long distances in the multicast routing tree, in contrast to the TOM protocol, which operates under the assumption that the structure of the ACK-tree mirrors the path information in the multicast routing tree, rather than using separate propagation graphs. Comparing the three tree-based methods, it will be appreciated that the TOM protocol of the present invention provides equal, or improved, performance in relation to either the MG or MP protocols. TOM also spreads the computational load of ordering packets over multiple nodes in the tree, and is well suited for dynamically altering multicast groups, rather than catering to static membership and long-lived transmissions.

5. Conclusions

The present invention provides for the addition of ordering services to tree-based concurrent reliable packet multicasting which is essential to a growing number of Internet applications supporting telepresence and near-synchronous information sharing. Considering the use of reliable multicasting for these applications, it has been observed that ordering services have not been integrated as a component in the currently available data dissemination methods. The TOM protocol, however, stands in contrast to previous reliable broadcast solutions tailored to local area networks, wherein ordering was performed assuming symmetric communication, centralized, ring-based, or propagation graph schemes. It will be appreciated that the TOM protocol is readily applicable to a number of multicasting applications. Furthermore, although TOM is directed towards the addition of an ordering capability for use within reliable concurrent multicasting, such as defined by Lorax, it may be equally deployed in other frameworks, for example, TMTP with domain managers, and in RMTP with designated receivers as intermediate ordering nodes.

Accordingly, it will be seen that the TOM protocol is solution directed at providing reliable multicast trees, using staggered ordering of messages on their paths from sources to receivers. The workload of executing the ordering protocol when utilizing the TOM protocol is distributed across the nodes wherein the infrastructure being utilized for packet ordering is cohesive and results in reliable operation. The addition of address labels yields efficient ordering for multiple groups and subgroups. In contrast with other prominent solutions, the TOM protocol does not require computation of separate graphs for propagating ordering information. The TOM multicast ordering protocol implements ordering in a diffusing computation, wherein messages are ordered on their delivery paths from sources to receivers, and each node communicates only with its children and parent node instead of the entire multicast group. A taxonomy has been proposed for ordering schemes integrating reliable broadcast and multicast solutions. A simple performance comparison has illustrated that ordering within trees surpasses the use of contending solutions in terms of scalability, efficiency, and practicality. It should be appreciated that although the description of distributed multicasting solution for tree-based multicasting was exemplified with method steps and pseudocode procedures, it may be implemented with numerous variations by one of ordinary skill in the art without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A concurrent, multicast communication method for transmitting data packets over a network of interconnected nodes, comprising:
   multicasting a message from a source node to a receiver group;
   unicasting a control message from a source node across a primary node to an ordering node for a designated multicast group or transmission, wherein said primary node aggregates messages from their subtrees and hence staggers the ordering process upward within the tree;
   determining a binding sequence number for this message and a multicast to the receiver group; and
   delivering messages at end hosts according to agreed-upon sequence numbers.

2. A method as recited in claim 1:
   wherein said messages are delivered in an order agreed-upon by all hosts.

3. A method as recited in claim 1:
   wherein each node i in an acknowledgment-free is labeled with a unique label l(i), which is the prefix of all children of i.

4. A method as recited in claim 1:
   wherein, for each set of messages destined to a particular multicast group, or set of hosts, an ordering node is elected by virtue of being the node having label that is the longest common prefix among all node labels in the receiver set.

5. A method as recited in claim 4:
   wherein each ordering node gathers sequence number bids set en route by primary nodes deciding on a globally valid number, and multicasts the respective message to the receiver set with a final and binding sequence number directive.

6. A concurrent, multicast communication method for transmitting data packets over a network of interconnected nodes, comprising:
   multicasting a message from a source node to a receiver group;
   unicasting a control message from a source node across a primary node to an ordering node for a designated multicast group or transmission, wherein said primary node aggregates messages from their subtrees and hence staggers the ordering process upward within the tree;
   determining a binding sequence number for this message and a multicast to the receiver group; and
   delivering messages at end hosts according to agreed-upon sequence numbers;
   wherein said messages are delivered in an order agreed-upon by all hosts.

7. A method as recited in claim 6:
   wherein each node i in an acknowledgment-tree is labeled with a unique label l(i), which is the prefix of all children of i.

8. A method as recited in claim 6:
   wherein, for each set of messages destined to a particular multicast group, or set of hosts, an ordering node is elected by virtue of being the node having label that is the longest common prefix among all node labels in the receiver set.

9. A method as recited in claim 8:
   wherein each ordering node gathers sequence number bids set en route by primary nodes deciding on a globally valid number, and multicasts the respective message to the receiver set with a final and binding sequence number directive.

10. A method as recited in claim 8:
wherein each node i in an acknowledgment-tree is labeled with a unique label 1(i), which is the prefix of all children of i.

11. A concurrent, multicast communication method for transmitting data packets over a network of interconnected nodes, comprising:
multicasting a message from a source node to a receiver group;
unicasting a control message from a source node across a primary node to an ordering node for a designated multicast group or transmission, wherein said primary node aggregates messages from their subtrees and hence staggers the ordering process upward within the tree;
determining a binding sequence number for this message and a multicast to the receiver group;
delivering messages at end hosts according to agreed-upon sequence numbers;
wherein said messages are delivered in an order agreed-upon by all hosts;
wherein, for each set of messages destined to a particular multicast group, or set of hosts, an ordering node is elected by virtue of being the node having label that is the longest common prefix among all node labels in the receiver set; and
wherein each ordering node gathers sequence number bids set en route by primary nodes deciding on a globally valid number, and multicasts the respective message to the receiver set with a final and binding sequence number directive.

* * * * *